United States Patent Office 2,857,278
Patented Oct. 21, 1958

2,857,278

PRODUCTION OF EDIBLE PROTEIN PRODUCTS FROM FISH SOLUBLES

Jeremiah Milner, Mossley Hill, Liverpool, England, assignor to Joymol (Proprietary) Limited, Johannesburg, South Africa, a South African company No Drawing. Application December 19, 1956
Serial No. 629,219

Claims priority, application Union of South Africa January 17, 1956

7 Claims. (Cl. 99—14)

This invention relates to the production of soluble edible protein products from the material which is known in the fish processing industry, as "fish solubles." This material is the liquid remaining after the removal of suspended solids and oils from Stickwater.

Fish solubles are obtained not only in that part of the fishing industry which deals with fish such as sardines, pilchards and white fish but also in that part which deals with whales and the term "fish solubles" accordingly embraces the analogous product obtained from whales which is sometimes referred to as "whale solubles."

The so-called fish solubles comprise an aqueous liquor which is rich in proteins and vitamins. This liquid is commonly used in the preparation of cattle food but hitherto it has not been found possible to obtain from it a protein product sufficiently free from fishy taste and odor to be acceptable for human consumption. It has now been found possible to obtain from fish solubles a syrupy liquid or powder which is sufficiently free from objectionable taste or smell to be acceptable for human consumption, which contains proteins and/or protein hydrolysis products in a form readily assimilable by man and which retains a high proportion of the vitamins present in the fish solubles, resulting in a product comparable in composition to an enzyme digest of liver.

The solids in fish solubles consist essentially of partially water-soluble proteins, B-vitamins, salts and ether-extractable substances. The solids in the syrupy liquid or powder obtained by the process of the present invention consist essentially of amino acids, peptides, B-vitamins and salts; the syrupy liquid or powder is practically free from ether-extractable substances.

The process according to the present invention for the production of an edible product from fish solubles comprises subjecting the fish solubles to hydrolysis by means of acid of which at least half is hydrochloric acid for a time not exceeding 35 minutes substantially at the boiling point, treating the liquid with alkali until its pH is from 5 to 5.5 while maintaining it substantially at the boiling point, diluting the liquid with water and filtering it while still hot and subjecting the filtrate to evaporation under vacuum until the distillate is no longer alkaline.

It is, of course, well known to produce protein hydrolyzates by hydrolysis with acids, alkalis or enzymes. The hydrolysis of solid proteins with acids necessitates the use of high concentrations of acid and of fairly high temperatures for prolonged periods. This results in the substantial destruction of vitamin B complexes. By subjecting the proteins in fish solubles to acid hydrolysis, however, it has been found possible to employ such restricted times and mild conditions of acid hydrolysis that the B-vitamins are substantially retained and the amino acid tryptophane is preserved at an effective level while at the same time the proteins are hydrolyzed to a sufficient extent to make them very readily digestible. It is simply necessary that the quantity and strength of the acid and the time are sufficient to produce a product which is filterable hot when brought to a pH of from 5 to 5.5 and after dilution to a solids content of substantially 25% by weight. If the conditions are more drastic than this, then serious loss of vitamins is likely to occur.

It is preferred that the acidity of the liquid during hydrolysis does not exceed the acidity of pH 1.0. The time of hydrolysis is preferably from 20 to 30 minutes. Vigorous stirring is desirable during the acid hydrolysis.

The acid may consist wholly of hydrochloric acid or of a mixture of hydrochloric acid with one or more of the following acids, namely, sulphuric acid, acetic acid and phosphoric acid.

The treatment of the acid solution with alkali while substantially at the boiling point results in an evolution of unpleasant smelling gases. Vigorous stirring is desirable also during the alkali treatment. The alkali used is preferably sodium and potassium hydroxide and it is most suitable to use these in such relative amounts that the relative proportions of these metals in the end product are substantially 6 parts by weight of sodium to 9 parts by weight of potassium. For most uses of the product it is desirable that the sodium content should not be unduly high.

The amount of water added before filtration is preferably sufficient to give a diluted liquid containing substantially 25% by weight of solids. The filtration removes the insoluble materials which include the ether extractable substances. Much of the unpleasant smelling and tasting substances is retained on the filter while the hydrolyzed protein is contained in the filtrate. The filtrate is a clear dark brown liquid having a meaty smell and taste.

The evaporation of the filtrate under vacuum is preferably effected under an absolute pressure less than 2.5 centimetres of mercury. Further unpleasant smelling gases are removed by this evaporation and the taste is thereby improved. The evaporation is preferably continued until the solution has a specific gravity of about 1.25. At this stage the solution is still clear. The addition to the solution before evaporation of a little acetic acid improves the flavor of the product.

The resulting syrupy solution may be mixed with an edible solid such as a cereal, e. g. maize meal, and the mixture dried. Alternatively the syrup may be dried, preferably spray dried. It is desirable to adjust the pH of the syrup to about 6.0 but should never exceed 6.2.

A preferred form of the invention will be described by reference to the following example:

*Example*

455 kilogrammes of liquid fish soluble containing about one third of its weight of protein is run into a suitable acid-resisting vesesl provided with a stirrer and heating means.

68.0 kilogrammes w./w. of 30% commercial hydrochloric acid are added to the fish solubles, the stirrer started up and the temperature steadily raised to the boiling point which is about 105° C. The mixture is kept at this temperature for about 20 minutes. It is neither necessary nor desirable to heat under pressure. After this time, heating is discontinued and the temperature allowed to fall to about 80° C. 39.0 kilogrammes of commercial caustic soda solution 40% w./w. are then run slowly in, followed by 25.0 kilogrammes of commercial potassium hydroxide solution 40% w./w. with vigorous stirring, whereby the mixture returns to the boiling point. 270 litres of tap water are then added and the mixture vigorously stirred for about 10 minutes.

The liquid mixture while still hot is filtered. The filtered liquor should be clear, i. e. free of cloudiness. The smell and taste should not be bitter and there should be little fish odor as compared with the original fish liquor.

The specific gravity should be about 1.125 and 15° C. and the pH about 5.5.

Acetic acid is then added to the filtrate (1 litre commercial acetic acid for each 454 litres of filtrate) after which it is evaporated under an absolute pressure of at most 2.5 centimetres of mercury to about half its volume. The resulting syrupy solution has a specific gravity of about 1.25 at 15° C. and is quite palatable.

It can be stored until required for use.

If it is spray dried, its pH should be adjusted to 6.0 immediately before spray drying. Spray drying of the syrup obtained as above yields about 181 kilogrammes of a powder containing approximately 60% of protein which is hydrolyzed to the extent of 71%, and includes an adequate proportion of tryptophane. The product also contains a very useful amount of riboflavin, nicotinic acid, vitamin $B_{12}$ and choline.

The powder is platable, dissolves readily in milk or water and is quite safe for human consumption. Its high content of free amino acids plus soluble proteins and the quality of these coupled with its useful content of B vitamins makes it a useful dietary preparation.

If desired, the proportion of crystalloidal salts in the syrupy solution obtained by cooperation can be reduced by dialysis. It is undesirable, however, to continue the dialysis for more than about 2 hours since this may reduce the palatability of the product.

Alternatively a liquid concentrate with a low salt content can also be prepared by passing the hydrolyzed and filtered liquors through an ion exchange column, and removing the excess acidity. This de-acidified and filtered liquor can then be evaporated to the required specific gravity.

I claim:

1. A process for the production of an edible protein product from fish solubles, said fish solubles being the liquid remaining after solids and oils have been removed from Stickwater, comprising subjecting said fish solubles to hydrolysis by means of an acid of which at least half is hydrochloric acid at an acidity not exceeding the acidity of pH 1.0 and for a time not exceeding 35 minutes substantially at the boiling point of said fish solubles, treating said fish solubles with an alkali metal hydroxide until the pH is from 5 to 5.5 while maintaining said fish solubles at the boiling point, diluting the treated liquid with water and filtering it while still hot, and subjecting the filtrate to evaporation under vacuum until the distillate is no longer alkaline.

2. The process as defined in claim 1 wherein said time is from 20 to 30 minutes.

3. The process as defined in claim 1 wherein said alkali metal hydroxide is selected from the group consisting of sodium hydroxide, potassium hydroxide and mixtures thereof.

4. The process as defined in claim 3 wherein the relative amounts of sodium hydroxide and potassium hydroxide are such that the relative proportions of these metals in the end product are substantially 6 parts by weight of sodium to 9 parts by weight of potassium.

5. The process as defined in claim 1 wherein the dilution with water is sufficient to give a diluted liquid containing substantially 25% of solids.

6. The process as defined in claim 1 wherein the pH of the product obtained by evaporation under vacuum is adjusted so as not to exceed 6.2.

7. The process as defined in claim 1 which includes the further step of drying and powdering the product finally obtained.

References Cited in the file of this patent

UNITED STATES PATENTS

| | | |
|---|---|---|
| 2,241,927 | Sahyun | Sept. 6, 1941 |
| 2,512,375 | Parfentjev | June 20, 1950 |
| 2,623,298 | Fladmark | Dec. 30, 1952 |

FOREIGN PATENTS

| | | |
|---|---|---|
| 136,853 | Great Britain | Dec. 31, 1919 |
| 284,636 | Great Britain | July 5, 1928 |